UNITED STATES PATENT OFFICE.

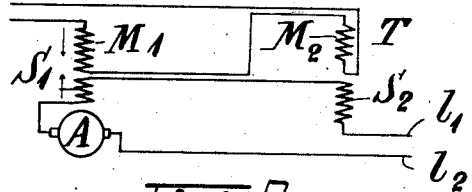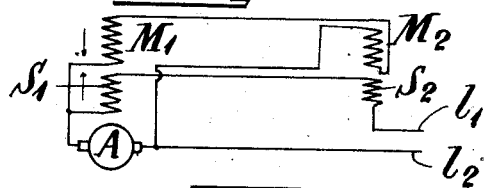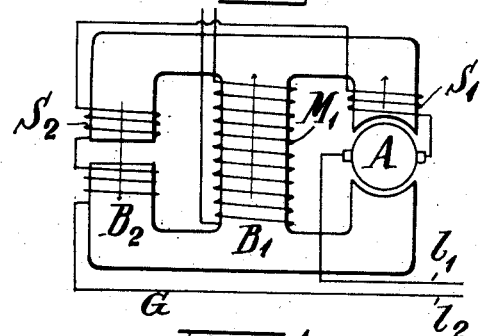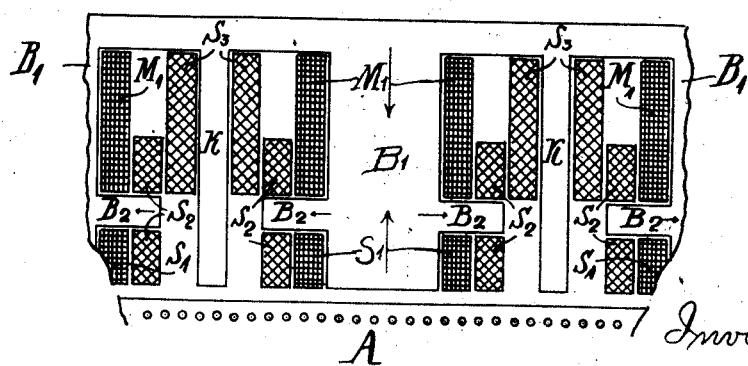

FRANS GEORG LILJENROTH, OF WESTERÅS, SWEDEN.

CONTINUOUS-CURRENT GENERATOR.

1,256,912.  Specification of Letters Patent.  Patented Feb. 19, 1918.

Application filed May 20, 1916. Serial No. 99,005.

*To all whom it may concern:*

Be it known that I, FRANS GEORG LILJENROTH, a citizen of the Kingdom of Sweden, residing at Westerås, Sweden, have invented new and useful Improvements in Continuous-Current Generators, of which the following is a specification.

My invention relates to continuous current generators and particularly to shunt or separately excited generators of that type.

Such generators are in regular working frequently exposed to short-circuits and, owing thereto, it has been necessary to limit the short-circuit current by providing the generator with an effectively counteracting compound winding. It happens, however, frequently that in spite of such a device the short-circuit current immediately after the short-circuit amounts to values injurious to the generator. This depends on the fact that, upon a variation of the magnetic field of the generator, a current is induced in the main magnet winding tending to prevent the variation of the field and thus counteracting the compound winding.

The object of my invention is to provide means by which, at short-circuits in machines of the aforesaid type, a rapid decrease of the magnetic flux is effected.

With this object in view my invention consists, chiefly, in the combination with the generator, of means whereby a tension proportional to the speed of variation of the load current is induced in the exciting circuit, said tension being directed oppositely to that induced in the exciting winding from the compound winding.

The accompanying drawing illustrates different embodiments of the invention.

Figure 1 shows diagrammatically a separately excited generator having a transformer for inducing the counteracting tension in the exciting circuit. Fig. 2 is a similar device applied to a shunt excited generator. Fig. 3 is a modified form of the device shown in Fig. 1. Fig. 4 shows still another modified form of the invention.

Referring to Fig. 1, A denotes the armature of the separately excited generator feeding the load circuit $l_1$, $l_2$. $M_1$ is the main exciting winding, and $S_1$ is a counteracting series winding for limiting the short-circuit current. T is a transformer, one winding $S_2$ of which is connected in series with the load current, while the other winding $M_2$ is connected in series with the exciting winding $M_1$. The windings $S_2$ and $M_2$ have such a mutual direction of winding, that at a variation of the load current a tension is induced in the winding $M_2$ directed oppositely to that induced in the winding $M_1$ from the winding $S_1$. By suitably sizing the windings $M_1$, $S_2$ and $M_2$ the said tensions may be brought to neutralize each other thus effecting a rapid decrease of magnetic flux in the generator, for instance in case of short-circuits.

The device shown in Fig. 2 differs from that illustrated in Fig. 1 only in that the exciting winding $M_1$ connected in series with the transformer winding $M_2$ is shunted to the armature A.

In Figs. 1 and 2 the arrows indicate both the direction of the magnetic forces or fields and of the currents. In Figs. 3 and 4 the arrows indicate the direction of the fields.

In the constructional form shown in Fig. 3 the transformer T is, so to say, mounted in the generator G, so that the useful tension induced by the short-circuit current is passed directly into the exciting winding $M_1$. $S_1$ denotes the counteracting compound winding, $M_1$ the main exciting winding placed on the limbs $B_1$ and $S_2$ another series winding placed on an intersected limb $B_2$ forming a magnetic shunt to the winding $M_1$. The winding $S_2$ tends to increase the leakage flux generated by the winding $M_1$ and passing the shunt $B_2$. Said leakage flux is, however, at normal current, insignificant in comparison with the main flux passing the armature A. In case of short-circuiting, when the armature current and, consequently, the currents passing the windings $S_1$ and $S_2$ have surmounted many times the normal value, both fluxes will be of the same order of magnitude. If the decrease of the flux passing the armature A be equal to the increase of the leakage flux passing the shunt $B_2$, the flux passing the limb $B_1$ will, obviously, remain unchanged. Therefore, the decrease of the armature flux may take place without being retarded by currents induced in the main exciting winding.

In the modified form shown in Fig. 4 the invention is applied to a generator having a pole-system of common type and provided with commutation-poles. The magnet cores $B_1$ support the exciting windings $M_1$ and the counteracting series-coils $S_1$. The commutation poles K are provided with windings $S_3$. Placed between the windings $M_1$ and $S_1$ are the magnetic shunts $B_2$ supporting the series-coils $S_2$. The cores K of the commutating poles project into the path of the magnetic flux shunted from one main exciting pole to another across the air gaps between the main pole extensions $B_2$ forming the shunt poles for the magnetic circuit. While I have illustrated the poles so projecting into the path of the magnetic shunt, it is not absolutely necessary that they do so, as these poles do not interfere with or take part in the operation of the shunt poles $B_2$. The manner of operation is identical with that of the device shown in Fig. 3. In Figs. 3 and 4 is it of course obvious that the counteracting compound winding $S_1$ will be proportioned to the armature reaction; or in other words, if the counter action of the armature upon the main field were ultimately strong enough the winding $S_1$ may be dispensed with and at other values of the counter action of the armature (armature reaction) the winding $S_1$ will be inversely proportioned thereto. It is also obvious that the windings $S_1$ and $S_2$, Figs. 3 and 4 need not be situated at the particular location illustrated in these figures, it being sufficient to arrange them at any point on the iron to effect the purpose herein intended and with relation to the same flux direction.

Having now described my invention what I claim as new and desire to secure by Letters Patent is:

1. In an electric continuous current generator the combination with a main exciting winding and a counteracting compound winding; of a separate winding in inductive relation to said main exciting winding and traversed by the load current and counteracting the inductive action of said compound winding on the main exciting circuit.

2. In an electric continuous current generator, a main exciting winding, a counteracting compound winding and a magnetic shunt for the main magnetic field; in combination with a series winding placed on said shunt.

3. In an electric continuous current generator, a main exciting winding, a counteracting compound winding and a non-saturated magnetic shunt for the main magnetic field; in combination with a series winding placed on said shunt.

In testimony whereof I have signed my name.

FRANS GEORG LILJENROTH